United States Patent
Caruel et al.

(10) Patent No.: US 12,372,047 B2
(45) Date of Patent: Jul. 29, 2025

(54) THRUST REVERSER COMPRISING PRIMARY LATCHES OFFSET WITH RESPECT TO A PLANE OF SYMMETRY OF THE MOVABLE HOOD

(71) Applicant: SAFRAN NACELLES, Gonfreville-l'Orcher (FR)

(72) Inventors: Pierre Charles Caruel, Moissy-Cramayel (FR); Fabien Charliac, Moissy-Cramayel (FR); Fabien Bravin, Moissy-Cramayel (FR); Loïc Chapelain, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/640,112

(22) PCT Filed: Sep. 2, 2020

(86) PCT No.: PCT/FR2020/051520
§ 371 (c)(1),
(2) Date: Mar. 3, 2022

(87) PCT Pub. No.: WO2021/044097
PCT Pub. Date: Mar. 11, 2021

(65) Prior Publication Data
US 2022/0307446 A1    Sep. 29, 2022

(30) Foreign Application Priority Data

Sep. 5, 2019 (FR) .................................... 19 09759

(51) Int. Cl.
*F02K 1/76* (2006.01)

(52) U.S. Cl.
CPC .................................. *F02K 1/766* (2013.01)

(58) Field of Classification Search
CPC ....................................................... F02K 1/766
See application file for complete search history.

(56) References Cited

U.S. PATENT DOCUMENTS 3,419,218 A * 12/1968 Campbell ................. F02K 1/76
239/265.37
4,145,877 A * 3/1979 Montgomery ............ F02K 1/72
60/229

(Continued)

OTHER PUBLICATIONS

NASA "Aircraft Rotations" https://www1.grc.nasa.gov/beginners-guide-to-aeronautics/aircraft-rotations/ downloaded Aug. 22, 2023.*

(Continued)

*Primary Examiner* — Ted Kim
(74) *Attorney, Agent, or Firm* — Oblon, McClelland, Maier & Neustadt, L.L.P

(57) ABSTRACT

A thrust reverser for an aircraft propulsion assembly, this reverser including an outer structure movable between a closed position and an open position of two primary latches configured to lock the movable outer structure in the closed position. The movable outer structure includes an output end that is oblique with respect to the longitudinal central axis so as to orient the thrust laterally. In order to compensate the tilting moment of the movable outer structure, which results from this lateral orientation of the thrust, the primary latches are offset with respect to a median longitudinal plane passing through the longitudinal central axis of the reverser.

9 Claims, 7 Drawing Sheets

(56) References Cited

U.S. PATENT DOCUMENTS

| | | | | |
|---|---|---|---|---|
| 5,230,213 | A * | 7/1993 | Lawson | F02K 1/70 60/230 |
| 7,845,156 | B2 * | 12/2010 | Bigot | F02K 1/40 60/770 |
| 10,036,323 | B2 * | 7/2018 | Hurlin | F02K 1/72 |
| 2006/0042229 | A1 * | 3/2006 | Hanlon | F02K 1/766 60/226.2 |
| 2010/0126139 | A1 * | 5/2010 | Howe | F02K 1/1207 60/226.3 |
| 2012/0124963 | A1 | 5/2012 | Howe | |
| 2013/0062433 | A1 | 3/2013 | Vauchel et al. | |
| 2014/0061332 | A1 * | 3/2014 | Dezeustre | F02K 1/72 239/265.19 |
| 2014/0271163 | A1 * | 9/2014 | Hue | F02K 1/763 415/201 |
| 2016/0025037 | A1 * | 1/2016 | Gomes | F01D 25/24 415/1 |
| 2016/0208740 | A1 * | 7/2016 | Hue | F02K 1/766 |
| 2017/0283081 | A1 * | 10/2017 | Kestler | B64D 27/14 |
| 2019/0016471 | A1 | 1/2019 | Lieser et al. | |

OTHER PUBLICATIONS

International Search Report issued Dec. 1, 2020 in PCT/FR2020/051520, filed on Sep. 2, 2020, 2 pages.

French Preliminary Search Report issued May 19, 2020 in French Application 19 09759, filed on Sep. 5, 2019, 2 pages (with English Translation of Categories).

* cited by examiner ing turbojet engine. The thrust reverser typically comprises an external structure movable between a closed position and an open position, along a substantially horizontal central axis of the propulsion unit. In the closed position, the primary and secondary flows are directed towards an ejection nozzle so as to generate the thrust. In the open position, the movable external structure releases a radial opening allowing to redirect a portion of the primary and secondary flows towards the front of the propulsion unit in order to generate the counter-thrust.
THRUST REVERSER COMPRISING PRIMARY LATCHES OFFSET WITH RESPECT TO A PLANE OF SYMMETRY OF THE MOVABLE HOOD

TECHNICAL FIELD

The invention relates to the field of thrust reversers for aircraft propulsion units and relates more specifically to the system for latching a movable external structure.

The invention finds particular application in the field of aircrafts comprising propulsion units fixed to a rear portion of the fuselage.

PRIOR ART

The propulsion units mounted in the rear portion of the fuselage of an aircraft are generally configured to direct the thrust laterally in order to reduce the yaw moment in the event of failure of one of the turbojet engines.

When such a propulsion unit comprises a thrust reverser, the counter-thrust is generally produced from a mixture of primary and secondary flows generated by the corresponding turbojet engine. The thrust reverser typically comprises an external structure movable between a closed position and an open position, along a substantially horizontal central axis of the propulsion unit. In the closed position, the primary and secondary flows are directed towards an ejection nozzle so as to generate the thrust. In the open position, the movable external structure releases a radial opening allowing to redirect a portion of the primary and secondary flows towards the front of the propulsion unit in order to generate the counter-thrust.

To direct the thrust laterally, the outlet end of the movable external structure, which generally forms said ejection nozzle, defines a vertical plane not perpendicular to the central axis of the propulsion unit. Typically, the normal to this vertical plane forms with this central axis an angle comprised between 1° and 4°.

In general, the movable external structure of such a reverser is made in the shape of two half-hoods connected to each other by removable fastening means.

The junction of the two half-hoods tends to disrupt the flow of fluid generating thrust, which degrades the aerodynamic performance of the propulsion unit.

DISCLOSURE OF THE INVENTION

The invention aims at providing a thrust reverser capable of overcoming all or part of the aforementioned drawbacks.

To this end, the object of the invention is a thrust reverser for an aircraft propulsion unit, this reverser comprising:
- a movable external structure having a central longitudinal axis, this external structure being movable between a closed position, wherein said external structure is capable of guiding a flow of fluid in the propulsion unit so as to generate a thrust, and an open position wherein the movable external structure releases a radial opening capable of evacuating a portion of said flow of fluid from the propulsion unit so as to generate a counter-thrust,
- an actuator, such as a cylinder, configured to move the movable external structure between the closed and open positions,
- two primary latches configured to latch the movable external structure in the closed position.

This reverser is configured to direct the thrust-generating flow of fluid in an oblique direction with respect to the central longitudinal axis, towards a first side of a first median longitudinal plane passing through the central longitudinal axis.

According to the invention, the movable external structure is annular, the primary latches are both located on said first side of this first median longitudinal plane, and the actuator is located on the other side of the first median longitudinal plane, one of these primary latches being located on one side of a second median longitudinal plane perpendicular to the first median longitudinal plane, the other primary latch being located on the other side of this second median longitudinal plane.

In this document, a median longitudinal plane is a fictitious plane that passes through the central longitudinal axis of the movable external structure, and a transverse plane is a fictitious plane that intersects this central longitudinal axis. A plane is said to be oblique with respect to another plane when these two planes are neither perpendicular nor parallel to each other.

Moreover, the expression "annular structure" denotes a one-piece structure comprising a circumferentially closed perimeter. The movable external structure is therefore a continuous structure over 360 degrees, at least over a longitudinal portion of this structure. The term "one-piece" does not exclude the case of a structure manufactured by assembling, for example by welding, several parts, in so far as the structure thus manufactured forms, after assembling, a single part all the portions of which are fixedly integral with each other. Within the meaning of the present invention, a movable external structure formed by two half-hoods is therefore not an annular structure.

On the one hand, an annular movable external structure allows to eliminate the connection discontinuities formed by the hoods of a conventional movable external structure, which allows to improve the aerodynamic and structural performance of the propulsion unit.

On the other hand, the invention allows to move the movable external structure using a single actuator, given the one-piece nature of the movable external structure and the positioning of the primary latches. As indicated further below, the invention is however not limited to a reverser wherein the movable external structure is moved by a single actuator.

The invention further allows to latch the movable external structure despite its deformation under asymmetrical load, which can result in particular from the lateral orientation of the thrust and from non-uniform pressures applied to the exterior of this movable external structure related for example to the presence of the fuselage of the aircraft or of the pylon of the propulsion unit on which this reverser is mounted.

For example, in one embodiment, the movable external structure may comprise an outlet end defining an oblique transverse plane with respect to the first median longitudinal plane so as to direct the flow of fluid generating the thrust in said oblique direction.

Such a geometry of the outlet end of the movable external structure, which thus forms an ejection nozzle of the reverser, is common in propulsion units mounted in the rear portion of the fuselage of an aircraft, in order to reduce the yaw moment in the event of failure of one of the turbojet engines.

Regardless of the cause, an orientation of the thrust in said oblique direction results in the presence of a thrust component perpendicular to the central longitudinal axis of the movable external structure. This component generates a moment tending to tilt the movable external structure around a substantially vertical axis.

The offset of the primary latches with respect to the first median longitudinal plane, on the same side as that towards which the thrust is directed, allows these latches to take up the axial force resulting from the tilting moment so as to create a moment which compensates for this tilting moment.

It is thus possible to cancel the resulting moment so as to avoid or limit tilting or deformation of the movable external structure despite the oblique orientation of the thrust.

In general, the thrust deflection angle is relatively small, typically less than 5 degrees from the central longitudinal axis. The offset of the primary latches required to prevent the tilting of the movable external structure is therefore also relatively small. Typically, each of the two primary latches can be positioned at an angle comprised between 100° and 120° with respect to a point of the movable external structure located on a second side of the first median longitudinal plane opposite said first side, and located in the second median longitudinal plane.

Given the relatively small amplitude of the offset of the primary latches with respect to the first median longitudinal plane, the actuator which is located on said second side of this first plane is sufficient to produce on the movable external structure the axial force required to latch the primary latches, that is to say the axial force allowing to bring sufficiently close to the primary latches the portions of the movable external structure that must cooperate with these latches to allow them to be latched or unlatched.

The invention thus allows to latch the movable external structure under the action of a single actuator, using two primary latches which are moreover sufficient to prevent the tilting of the movable external structure despite the lateral deviation of the thrust.

This results in particular in a reduction of the clearance between the movable external structure and the fixed portion of the reverser in the closed position and consequently an overall improvement in aerodynamic performance.

Preferably, the two primary latches can be located in a latching plane parallel to said first median longitudinal plane.

A symmetrical arrangement of the primary latches with respect to the second median longitudinal plane allows in particular to balance the forces applied to the movable external structure in the closed position.

In one embodiment, each of the two primary latches can be positioned at an angular distance from the actuator comprised between 100° and 120°, preferably about 110°.

As indicated above, the movable external structure can be moved by several actuators, that is to say by the aforementioned actuator which is located on the second side of the first median longitudinal plane and by one or more other actuators located or not on the first side of this first median longitudinal plane.

However, it is preferred that said actuator be unique, in other words that the movement of the movable external structure be carried out only by this actuator, without assistance from another actuator.

Controlling the position of the movable external structure using a single actuator simplifies the structure and operation of the reverser and reduces its weight and cost.

In particular, a single actuator allows to avoid the synchronisation complexity encountered in conventional multi-cylinder actuation systems.

Preferably, the actuator, or at least one of the actuators when the reverser comprises several actuators, can be traversed by the second median longitudinal plane.

The object of the invention is also an aircraft propulsion unit, this propulsion unit comprising a thrust reverser as described above.

In one embodiment, this propulsion unit may comprise a pylon for attaching this propulsion unit to a fuselage of said aircraft, the pylon comprising a fairing sheltering said actuator, or at least one of the actuators when the reverser comprises several actuators.

Placing an actuator in the pylon allows to reduce its aerodynamic impact.

The object of the invention is also an aircraft comprising at least one such propulsion unit.

Other advantages and features of the invention will appear upon reading the detailed, non-limiting description which follows.

BRIEF DESCRIPTION OF THE DRAWINGS

The following detailed description refers to the appended drawings wherein.

DETAILED DESCRIPTION OF EMBODIMENTS

Each of the figures described below comprises a reference frame X, Y and Z respectively defining lateral, vertical and longitudinal directions.

Figure 1:
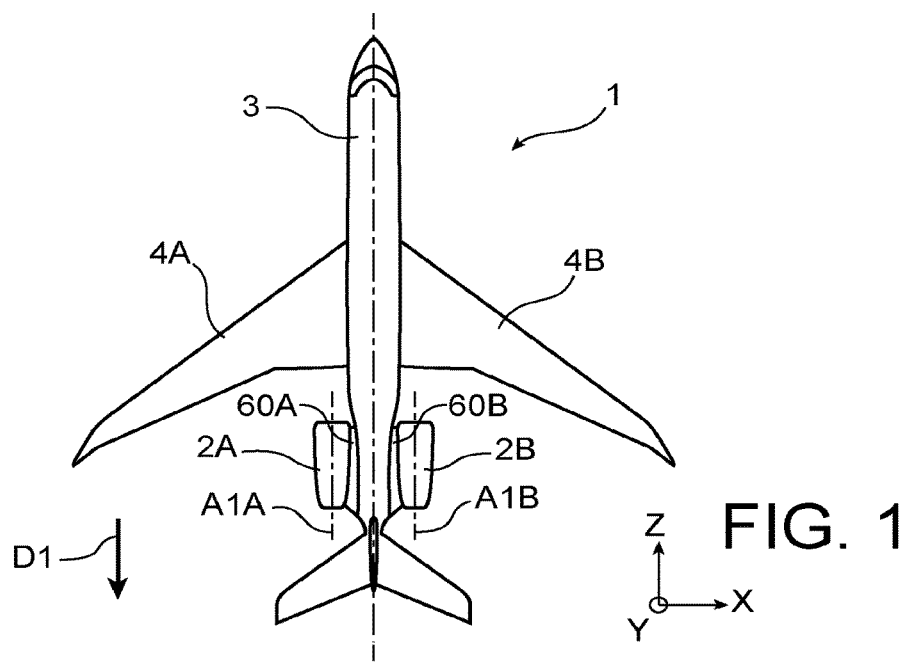
FIG. 1 is a schematic view of an aircraft in accordance with the invention.

FIG. 1 shows an aircraft 1 comprising two propulsion units 2A and 2B mounted via pylons 60A and 60B on the rear portion of the fuselage 3, downstream of the wings 4A and 4B.

In the present description, the terms "upstream", "downstream", "front" and "rear" are defined with respect to a direction D1 of air flow with respect to the aircraft 1 when the latter is propelled, the direction D1 being opposite to the direction of movement of the aircraft 1.

The propulsion units 2A and 2B each extend along a central longitudinal axis A1A, A1B substantially parallel to the longitudinal direction Z, so that the air and the gases passing through these propulsion units 2A and 2B and contributing to the propulsion of the aircraft 1 circulate in these units in the direction D1.

Figure 2:
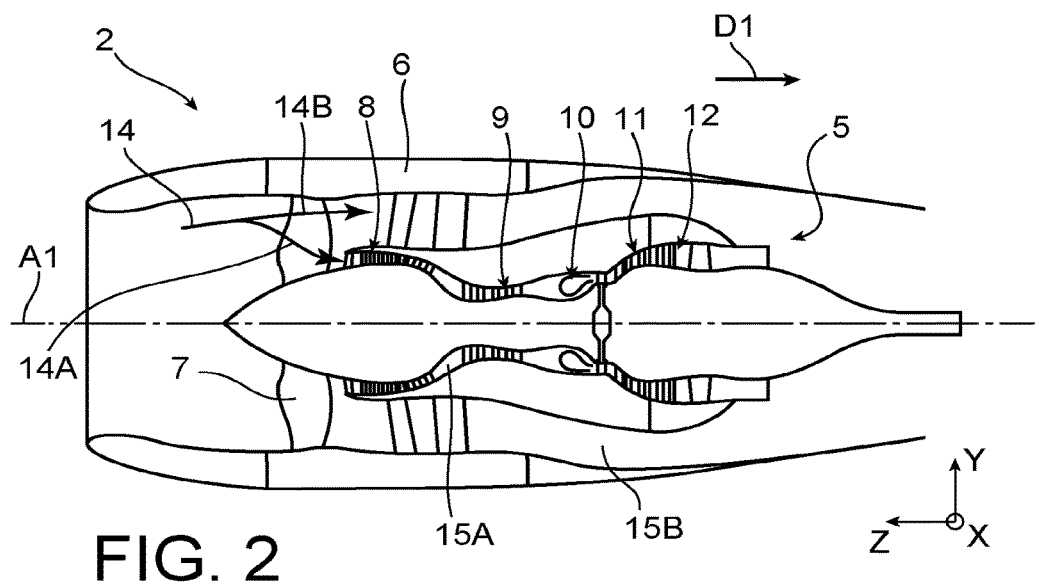
FIG. 2 is a schematic view in axial section of a propulsion unit in accordance with the invention.

In this example, each of the propulsion units 2A and 2B are similar to the propulsion unit 2 illustrated in FIG. 2.

In a manner known per se, the propulsion unit 2 of FIG. 2 comprises a turbomachine 5 faired by a nacelle 6. In this example, the turbomachine 5 is a two-spool, bypass turbojet engine.

The turbojet engine 5 has a central longitudinal axis A1 around which its various components extend, in this case, from the front to the rear of the turbojet engine 5, a fan 7, a low-pressure compressor 8, a high-pressure compressor 9, a combustion chamber 10, a high-pressure turbine 11 and a low-pressure turbine 12. The compressors 8 and 9, the combustion chamber 10 and the turbines 11 and 12 form a gas generator.

During operation of the turbojet engine 5, an air flow 14 enters the propulsion unit 2 via an air inlet upstream of the nacelle 6, passes through the fan 7 and then is divided into a central primary flow 14A and a secondary flow 14B. The primary flow 14A flows in a primary flow path 15A for the circulation of gases passing through the gas generator. The secondary flow 14B flows in a secondary flow path 15B surrounding the gas generator and delimited radially outwards by the nacelle 6.

The invention relates more specifically to a thrust reverser 20 as illustrated in FIGS. 3 to 9, this reverser 20 having the function of reversing a portion of the thrust generated by such a propulsion unit 2 in order to brake the aircraft 1 when landing.

The reverser 20 can of course equip a propulsion unit different from that of FIG. 2 without departing from the scope of the invention.

Figure 3:
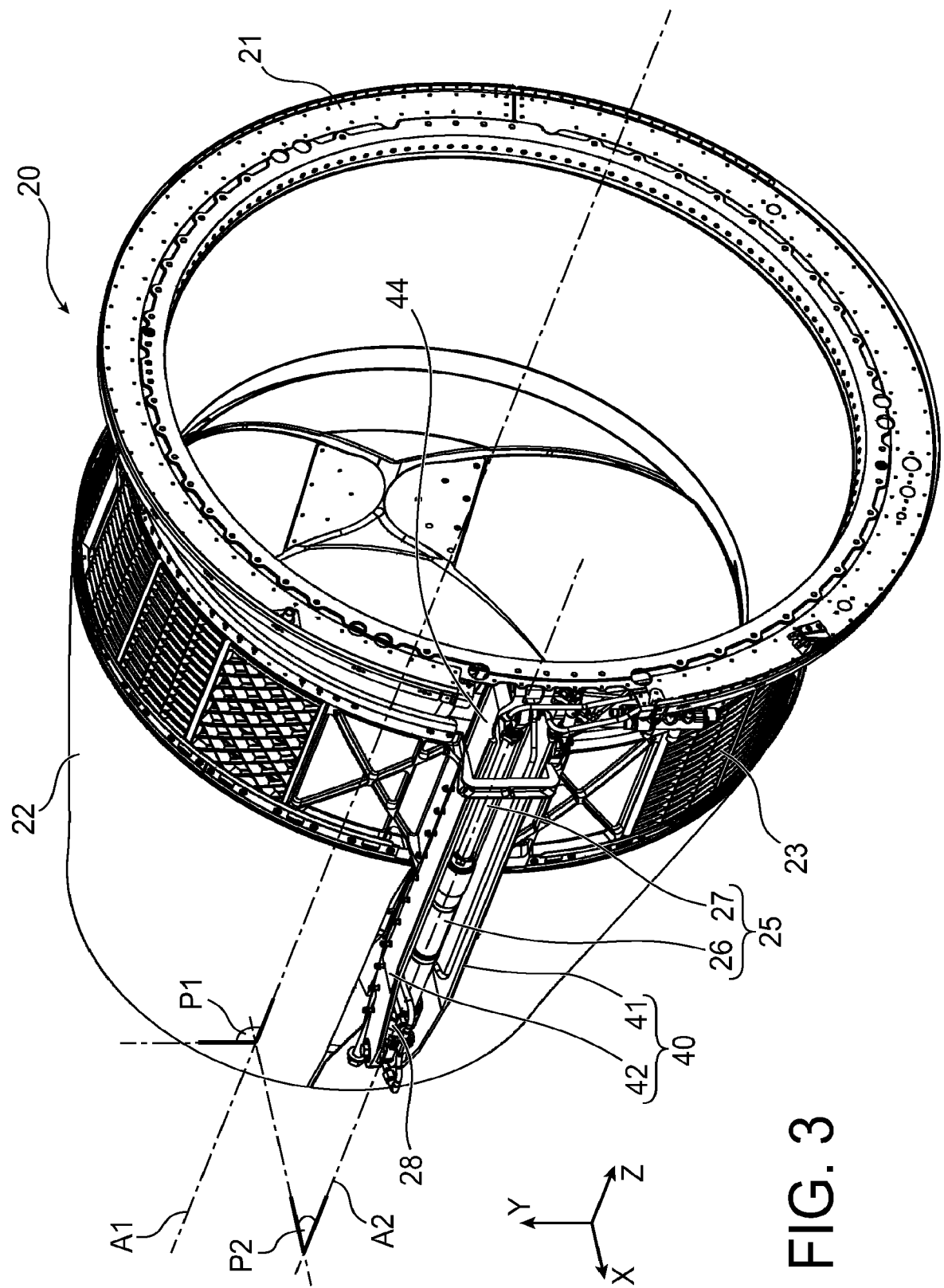
FIG. 3 is a schematic perspective view of a portion of a thrust reverser in accordance with the invention, this figure showing a cylinder for controlling a movable external structure of the reverser as well as a slide of a guide device of this movable external structure, the reverser being in a direct thrust configuration wherein the movable external structure is in a closed position.

With reference to FIG. 3, the reverser 20 comprises a fixed structure including in particular a front frame 21. The front frame 21 is in this example intended to connect the reverser 20 to the nacelle 6 of the propulsion unit 2, by fixing this front frame 21 to a rear frame (not shown) of the nacelle 6.

The reverser 20 moreover comprises a movable external structure 22 forming a movable hood in axial translation along the axis A1 with respect to the fixed structure 21.

The axis A1 here corresponds both to a central longitudinal axis of the reverser 20, to the central longitudinal axis of the turbojet engine 5 as well as to a central longitudinal axis of the propulsion unit 2.

The movable external structure 22 is in this example an annular structure of axis A1 made in one piece.

The reverser 20 moreover comprises cascades 23 configured to direct the diverted flow of fluid forward of the propulsion unit 2 to generate the counter-thrust (see further below).

The cascades 23 are in this example integral with the movable external structure 22. In an embodiment not shown, the cascades 23 are integral with the fixed structure of the reverser 20.

In this example, the thrust reverser 20 is intended to be mounted at the rear of the propulsion unit 2 so as to generate a counter-thrust from a mixed flow comprising a mixture of the primary 14A and secondary 14B flows exiting respectively the primary flow path 15A and the secondary flow path 15B of the propulsion unit 2.

FIGS. 3, 5, 8 and 9 show the reverser 20 in a direct thrust configuration, wherein the movable external structure 22 is in a closed position, that is to say in an advanced position with respect to the front frame 21 of the fixed structure.

In the closed position, the movable external structure 22 contributes to guiding the primary 14A and secondary 14B flows towards an ejection outlet downstream of the propulsion unit 2 so as to generate thrust.

Figure 8:
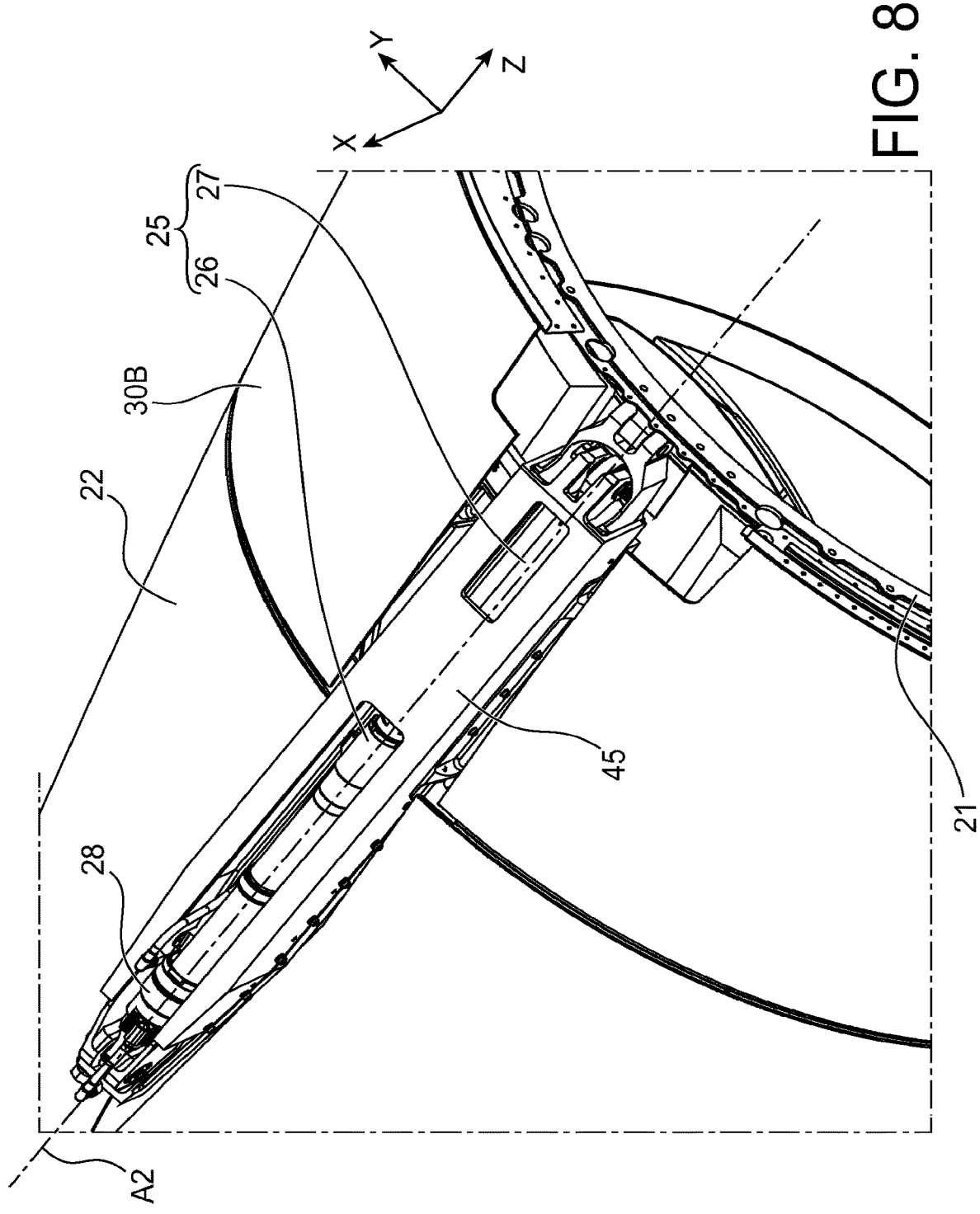
FIG. 8 is a schematic perspective view of the reverser of FIG. 3 in direct thrust configuration, this figure showing the sliding part of the guide device as well as an outer fairing covering the cascades of the reverser.
Figure 9:
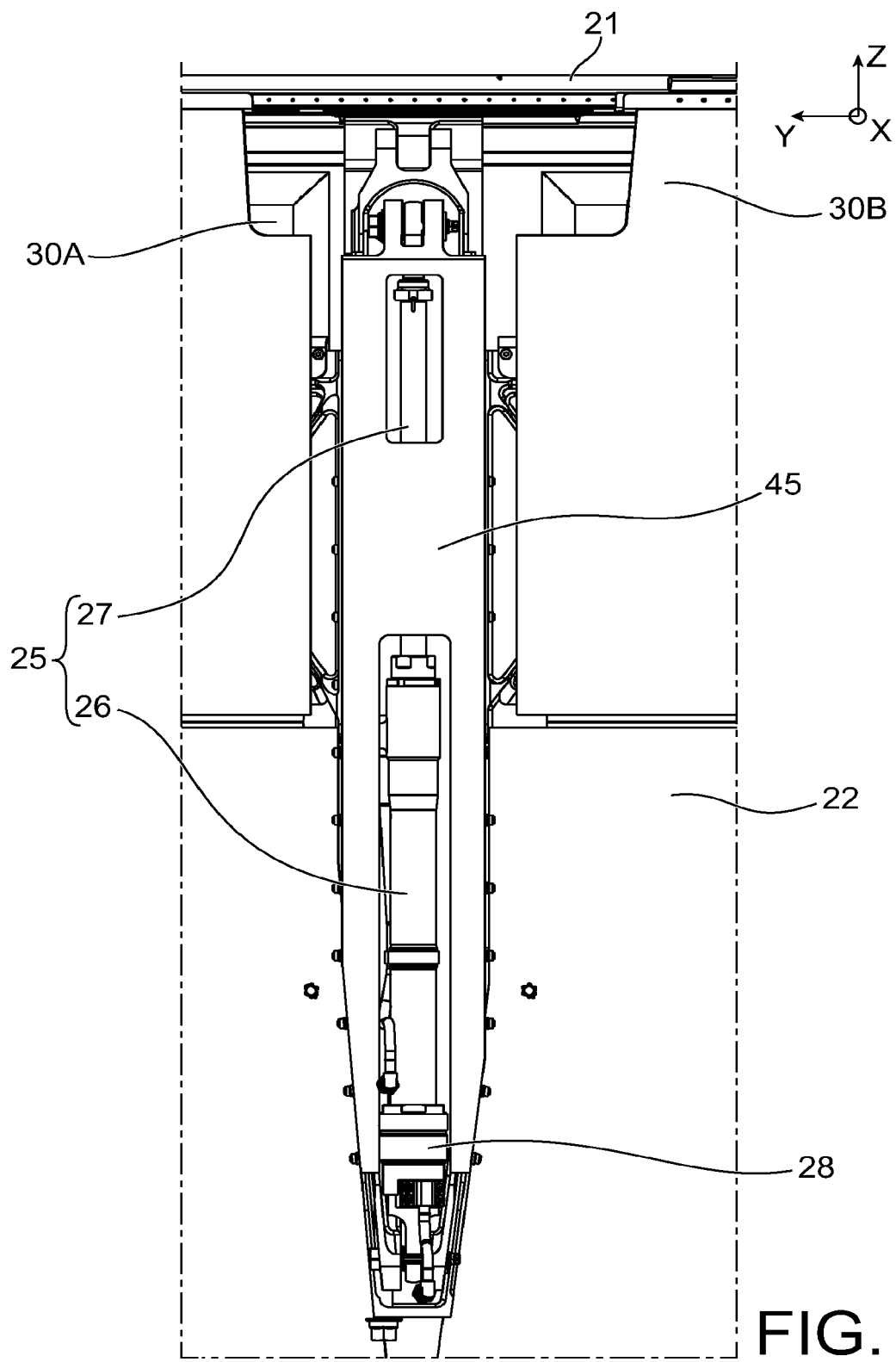
FIG. 9 is a schematic perspective view of the reverser of FIG. 3 in the direct thrust configuration, this figure showing the sliding part of the guide device as well as an outer fairing covering the cascades of the reverser.

In the direct thrust configuration, the cascades 23 are covered, in this case radially on the inside by an internal structure 30A (visible in FIGS. 5 and 9) and radially on the outside by an external fairing 30B (visible in FIGS. 8 and 9). The internal structure 30A and the fairing 30B are integral with the front frame 21. The internal structure 30A is in particular configured to prevent the fluid circulating in the propulsion unit 2 from accessing the cascades 23 and therefore from exiting the propulsion unit 2 through the cascades 23.

Figure 4:
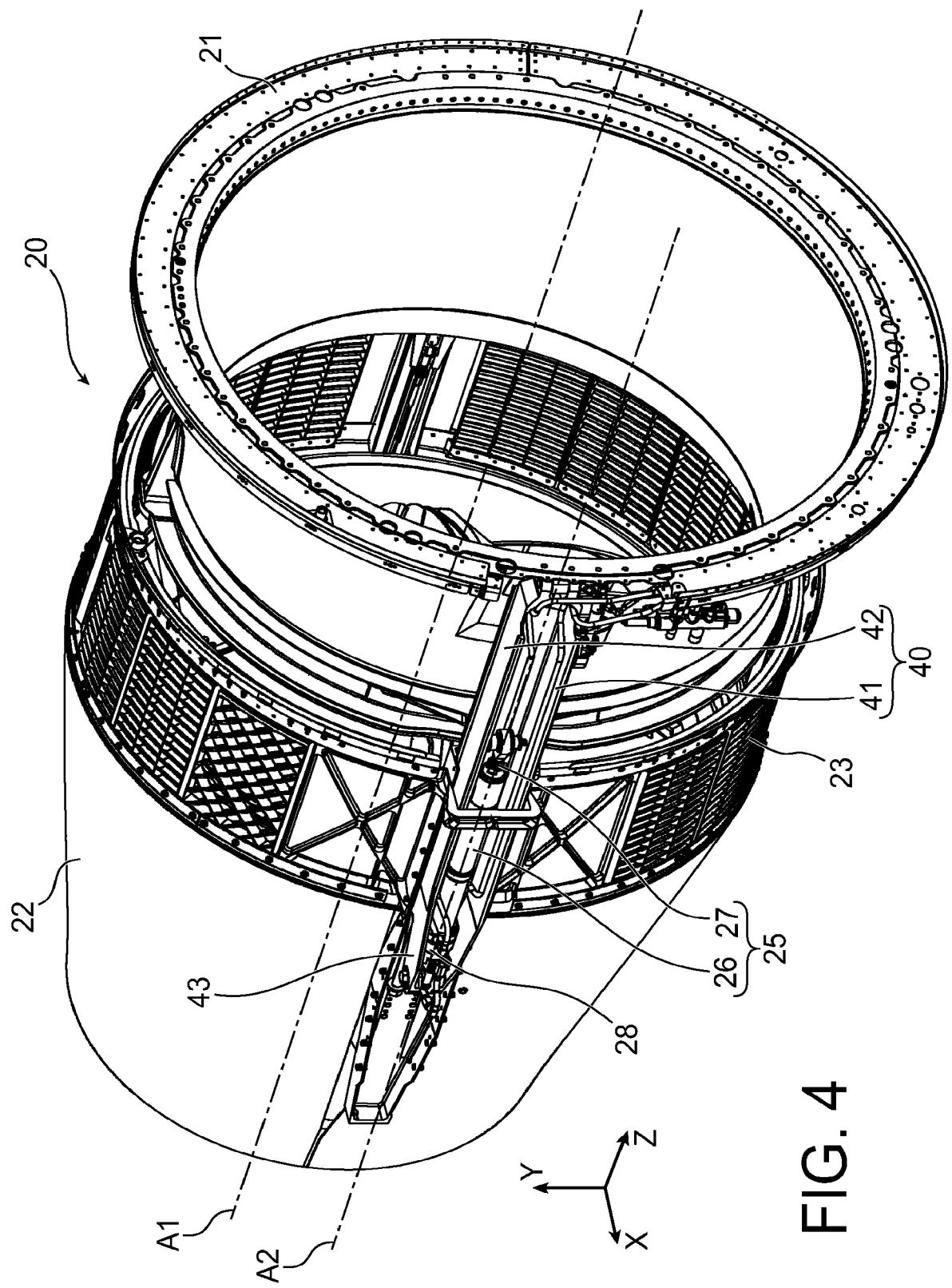
FIG. 4 is a schematic perspective view of the reverser of FIG. 3, the reverser being in a thrust reversal configuration wherein the movable external structure is in an open position.
Figure 6:
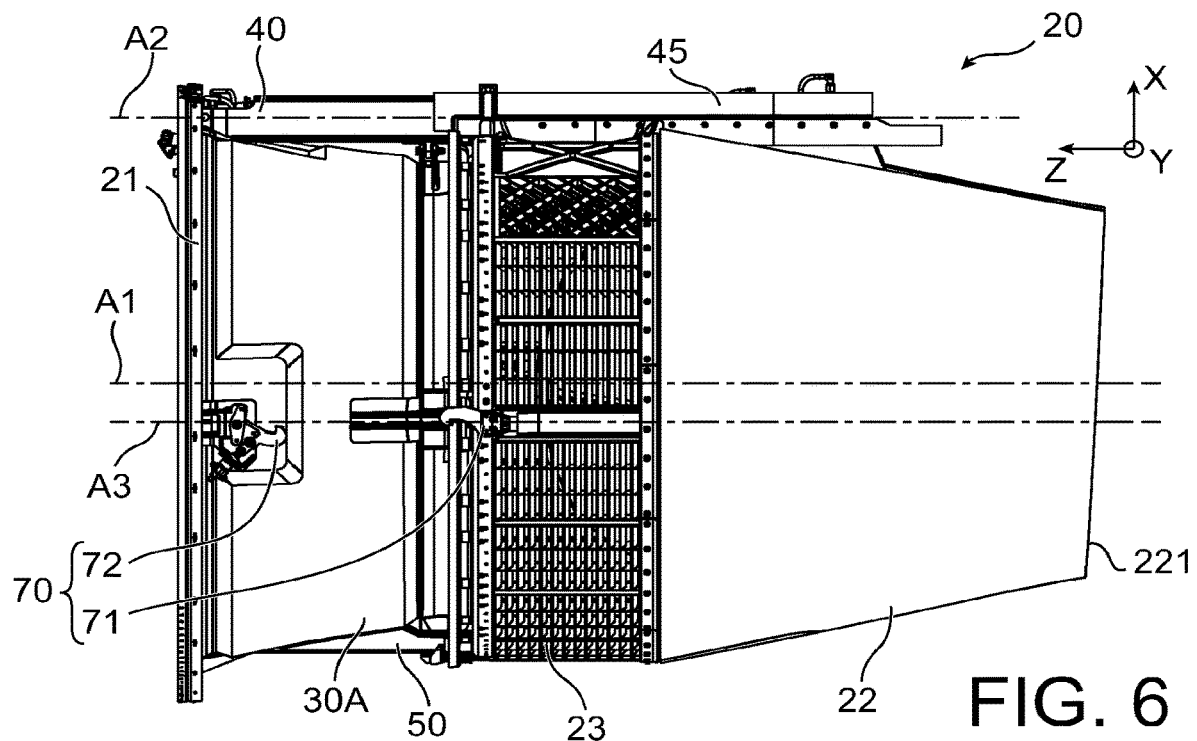
FIG. 6 is a schematic perspective view of the reverser of FIG. 3 in thrust reversal configuration, this figure showing an internal structure allowing the cascades to be covered radially on the inside when the reverser is in direct thrust configuration.
Figure 7:
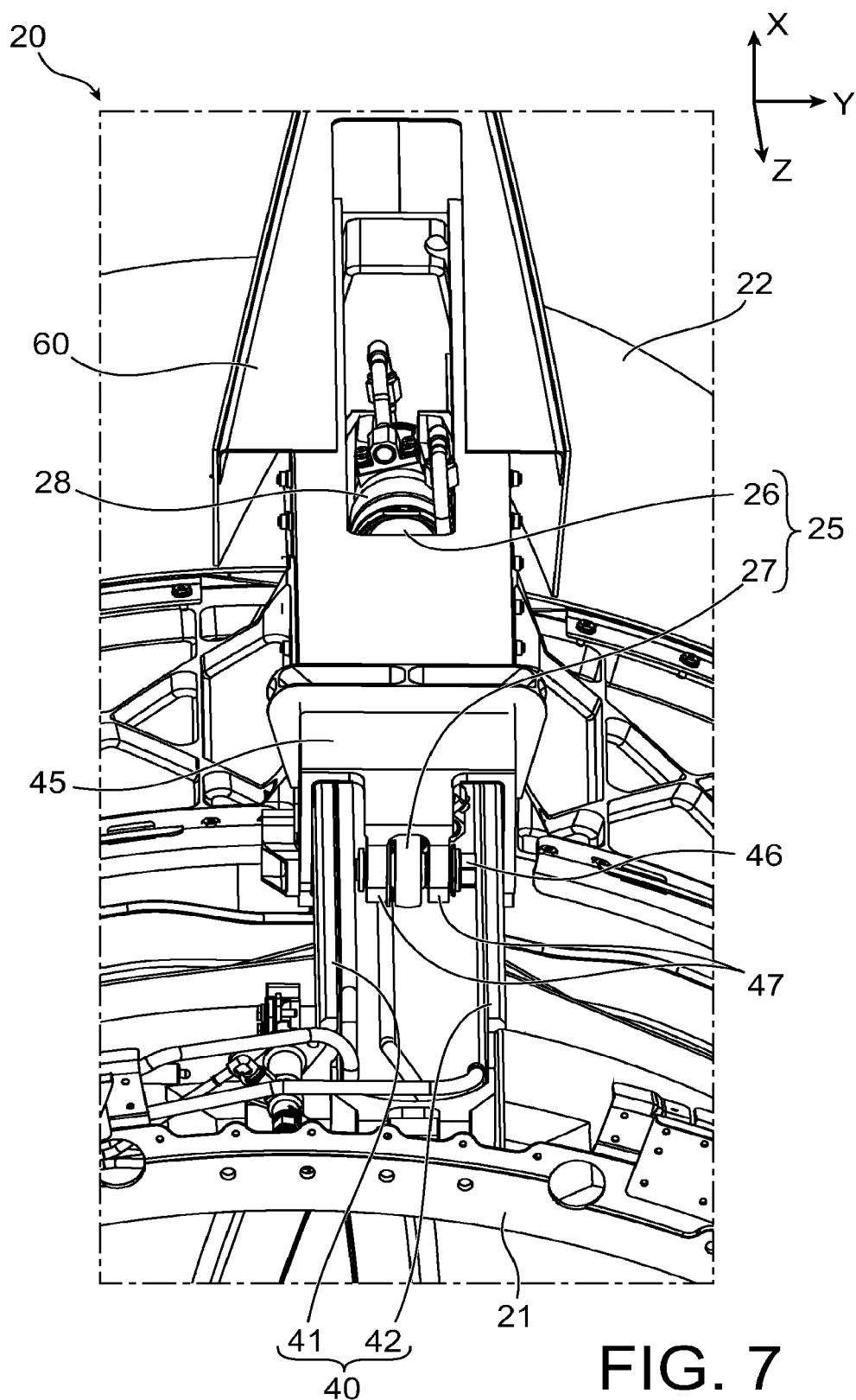
FIG. 7 is a schematic perspective view of the reverser of FIG. 3 in thrust reversal configuration, this figure showing a fairing element of a pylon as well as a sliding part of the guide device.

FIGS. 4, 6 and 7 show the reverser 20 in a thrust reversal configuration, wherein the movable external structure 22 is in an open position, that is to say in a retracted position with respect to the front frame 21 of the fixed structure.

In the open position, the movable external structure 22 releases a radial opening allowing to evacuate the mixed flow in order to generate a counter-thrust.

In this example, the radial opening is constituted by openings of the cascades 23, it being understood that the space located axially between the cascades 23 and the front frame 21 remains closed off by the internal structure 30A and the fairing 30B, since the latter are integral with the front frame 21.

In an embodiment not shown, the reverser 20 does not comprise cascades 23, the radial opening being constituted by an empty space corresponding substantially to the space occupied by the cascades 23 in the embodiment of FIGS. 3 to 9.

The use of cascades 23 is generally preferable because said cascades allow to maximise the axial component of the flow at the exit from the radial opening and consequently to increase the counter-thrust force, typically taking into account the curved shape of the vanes (not shown) delimiting the openings of the cascades 23.

The reorientation of the primary 14A and secondary 14B flows towards the cascades 23 is carried out by any conventional means, for example using pivoting flaps (not shown) connected on the one hand to the movable external structure 22 and on the other hand to the fixed structure of the reverser 20 so as to deploy radially in the propulsion unit 2 when the movable external structure 22 is open and to retract when the latter is closed.

In this example, the movement of the movable external structure 22 between the closed and open positions is carried out by a single actuator 25.

With reference to FIG. 3, the actuator 25 is a cylinder extending along an actuation axis A2 substantially parallel to the central longitudinal axis A1.

The cylinder 25 conventionally comprises a body 26 forming a fixed portion of this cylinder 25 and a rod 27 forming a movable portion of this cylinder 25.

The rod 27 is integral with a piston (not shown) housed in a cylindrical interior volume (not shown) of the body 26, the piston separating this cylindrical volume into two chambers which are hermetic and isolated from each other. The volume of these two chambers is not identical since one of them is traversed by the rod 27 connected to the piston.

The introduction of a pressurised fluid into the largest chamber, or large chamber, allows to move the piston and the rod 27 in a first direction of movement along the axis A2 causing the cylinder 25 to be deployed. The introduction of a pressurised fluid into the smallest chamber, or small chamber, allows the movement of the piston and the rod 27 in a second direction of movement along the axis A2 causing the cylinder 25 to be retracted.

The body 26 comprises two axial ends, in this case a front end located on the side of the rod 27 and a rear end opposite the front end.

With reference to FIGS. 3 and 4, the cylinder 25 is configured to place the movable external structure 22 in the open position when the cylinder 25 is retracted and to place the movable external structure 22 in the closed position when the cylinder 25 is deployed.

For this purpose, the body 26 of the cylinder 25 is in this example connected to the fixed structure of the reverser 20 by its rear end 28 and the cylinder 25 is oriented towards the front of the reverser 20, that is to say towards the front frame 21. The free end of the rod 27, that is to say the end opposite to that which is connected to the piston, is in turn connected to a part 45 integral with the movable external structure 22 (see further below).

Such a configuration of the cylinder 25 allows to reduce its dimensions since the force supplied by this cylinder during the pressurisation of the large chamber is used to close, over-retract and slow down the opening of the movable external structure 22, while the force provided during the pressurisation of the small chamber is used to open the movable external structure 22. The force required to close the movable external structure 22 is indeed greater than the force required to open this structure 22, said structure being in particular subject to aerodynamic forces having an axial component oriented from upstream to downstream.

The guiding of the movable external structure 22 during its movement between the closed and open positions is provided simultaneously by a main guide device described below and by an auxiliary guide device 50 visible in FIGS. 5 and 6.

The main guide device in this example comprises a slide 40 formed by two rails 41 and 42 integral with the fixed structure of the reverser 20. The rails 41 and 42 are visible in FIGS. 3, 4 and 7.

In this example, the rails 41 and 42 extend parallel to the actuation axis A2, on either side of the cylinder 25, so that the latter is housed between the rails 41 and 42.

More specifically, the cylinder 25 is housed in the slide 40 over its entire length. On the one hand, the rear end 28 of the body 26 of the cylinder 25 is connected to a rear end 43 of the slide 40 (see FIG. 4). On the other hand, the rails 41 and 42 are sized so as to extend on either side of the rod 27, including when the cylinder 25 is deployed. When the cylinder 25 is deployed, said free end of the rod 27 is axially located at a front end 44 of the slide 40 (see FIG. 3).

The main guide device moreover comprises a sliding part 45 integral with the movable external structure 22.

With reference to FIG. 8, the sliding part 45 is connected to the movable external structure 22 so as to extend radially outwards from this structure 22.

The sliding part 45 has a shape complementary to that of the rails 41 and 42 (see FIG. 7) allowing it to slide along the slide 40 when the movable external structure 22 is moved between the closed and open positions, and ensuring thus the guiding of the movable external structure 22 during such a movement.

With reference to FIG. 7, the sliding part 45 is in this example connected to the rod 27 of the cylinder 25 by means of a drive shaft 46 extending perpendicularly with respect to the actuation shaft A2. The drive shaft 46 passes through both an orifice (not shown) made in said free end of the rod 27 and orifices (not shown) made in a connecting member 47 of the sliding part 45. The connecting member 47 here comprises two lugs extending on either side of the free end of the rod 27.

The auxiliary guide device 50 is not shown in FIGS. 3 and 4 but is visible in FIG. 6. This device 50 conventionally comprises rails integral with the fixed structure of the reverser 20 and a sliding part integral with the movable external structure 22.

FIG. 3 shows two median longitudinal planes P1 and P2 allowing to locate the various elements of the reverser 20 with respect to each other.

Each of these fictitious planes P1 and P2 is a median plane in the sense that it passes through the axis A1 which is a central axis of the reverser 20, and a longitudinal plane since the axis A1 is also a longitudinal axis parallel to the longitudinal direction Z.

With reference to FIG. 3, the plane P2 also passes through the actuation axis A2 of the cylinder 25, and the plane P1 is perpendicular to the plane P2.

Thus, the cylinder 25 and the main guide device are both located on the same side of the plane P1 and the auxiliary guide device 50 is located on the other side of the plane P1. The cylinder 25 and the main and auxiliary guide devices are each traversed by the plane P2.

As indicated above, the rails 41 and 42 are located on either side of the cylinder 25 and therefore of the plane P2. Although none of these rails 41 and 42 is as such traversed by the plane P2, the main guide device, which comprises the two rails 41 and 42 and the sliding part 45, is as a whole traversed by the plane P2.

With reference to FIG. 7, the actuator 25 and the guide device are in this example sheltered by a fairing 60 of a pylon (not shown in this figure) for attaching the propulsion unit 2 to the fuselage 3 of the aircraft 1, or more generally to a pylon for attaching the propulsion unit 2 to an aircraft.

In this example, the movable external structure 22 is configured to direct the flow of fluid generating the thrust in an oblique direction with respect to the central longitudinal axis A1, more specifically so that the flow leaving the propulsion unit 2 tends to move away from the pylon.

Figure 5:
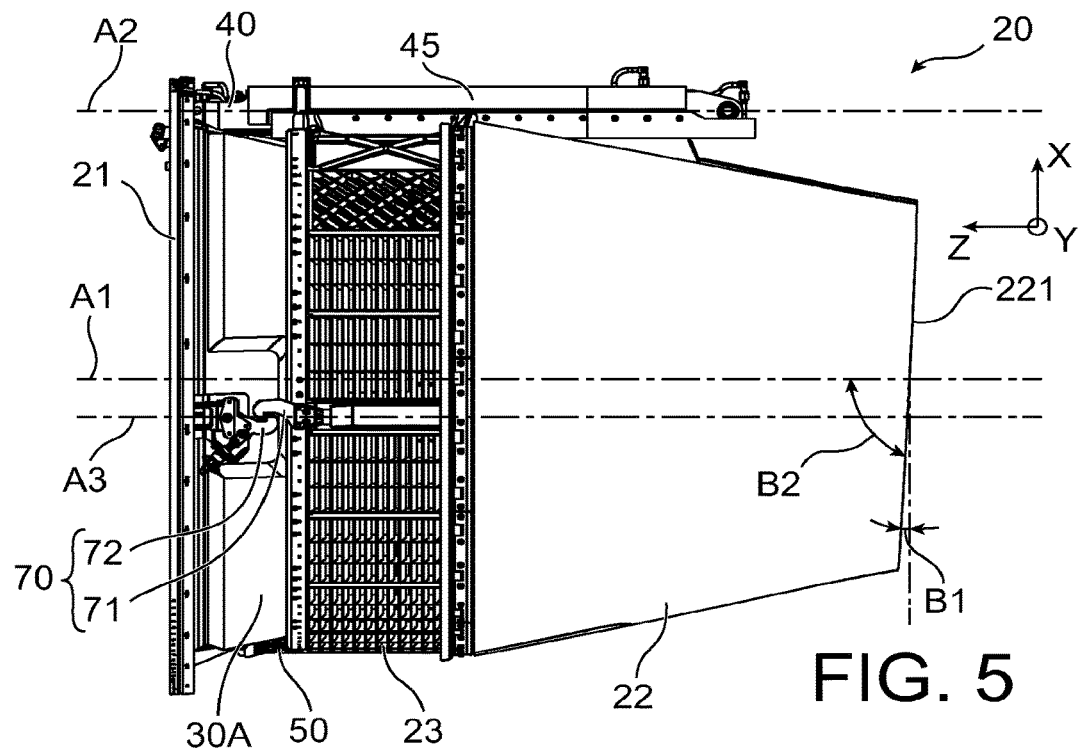
FIG. 5 is a schematic perspective view of the reverser of FIG. 3 in direct thrust configuration, this figure showing a primary latch in a latched state of the movable external structure.

With reference to FIG. 5, the movable external structure 22 comprises for this purpose an outlet end 221 defining a transverse plane forming an angle B1 with respect to the lateral direction X, this transverse plane therefore being oblique with respect to the first median longitudinal plane P1 and forming with this plane P1 an angle B2 complementary to B1.

Such a geometry of the outlet end 221 of the movable external structure 22 allows to direct the thrust opposite the pylon, that is to say towards the side of the plane P1 opposite to the side where the actuator 25 and the main guide device are located.

The thrust thus directed generates on the movable external structure 22 a force tending to tilt this structure around the vertical direction Y.

According to the invention, this tilting moment is compensated by the action of two primary latches 70 which are offset with respect to the axis A1 and with respect to the plane P1, in the lateral direction X outwards with respect to the pylon.

In a manner known per se, the primary latches 70 allow to latch the movable external structure 22 in the closed position. Only one of these latches 70 is shown in FIG. 5.

The primary latch 70 visible in FIG. 5 mainly comprises a first attachment element 71 integral with the movable external structure 22 and a second attachment element 72 integral with the fixed structure 21 of the reverser 20. The first and second attachment elements 71 and 72 extend along a latching axis A3 substantially parallel to the central longitudinal axis A1 and can be moved between a latched state and an unlatched state using any conventional control means. In the latched state, the first and second attachment elements 71 and 72 cooperate with each other so as to latch the movable external structure 22 in the closed position (see FIG. 5). In the unlatched state, the first and second attachment elements 71 and 72 are separated from each other to allow the movable external structure 22 to be moved between the closed and open positions under the action of the cylinder 25.

The other primary latch, not visible in FIG. 5, is similar to the one that has just been described.

In this example, the two primary latches 70 are located in a latching plane parallel to the median longitudinal plane P1. This latching plane passes through the respective latching axis A3 of each of these latches.

Circumferentially, each of the two primary latches 70 is in this example positioned at an angular distance from the actuator 25 of about 110°. This angular distance depends in particular on the angle B1 of the outlet end 221 of the movable external structure 22 since this angle has a direct impact on the amplitude of the tilting moment.

With reference to FIGS. 3 and 5, it follows from the foregoing description that the primary latches 70 are firstly both located on the side of the median longitudinal plane P1 opposite the side where the actuator 25 is located. The thrust flow moving away from the actuator 25, this configuration allows to compensate for the tilting moment and thus to limit the deformations of the movable external structure 22.

On the other hand, the primary latch 70 visible in FIG. 5 is located on one side of the median longitudinal plane P2 while the other primary latch, not visible, is located on the other side of this plane P2.

The embodiments which have just been described are in no way limiting. For example, the reverser 20 may comprise end-of-travel stops (not shown) configured to axially hold the movable external structure 22 in the open position. In one embodiment, one of these stops is located on the same side of the plane P1 as the actuator 25 and is centred with respect to the plane P2. The other stops can be positioned equidistant from each other so that each of them is traversed either by the plane P1 or by the plane P2.

In an embodiment not shown, the movable external structure 22 is a structure known under the name "O-Duct", that is to say a quasi-annular one-piece structure comprising a pylon passage opening.

The invention claimed is:

1. A thrust reverser for an aircraft propulsion unit, said reverser comprising:
   a movable external structure having a central longitudinal axis, said external structure being movable between a closed position, wherein said external structure is configured to guide a flow of fluid in the propulsion unit so as to generate a thrust, and an open position wherein the movable external structure releases a radial opening configured to evacuate a portion of said flow of fluid from the propulsion unit so as to generate a counter-thrust,
   a single actuator configured to move the movable external structure between the closed and open positions, and
   first and second primary latches configured to latch the movable external structure in the closed position, wherein
   said movable external structure is configured to direct the thrust-generating flow of fluid in an oblique direction with respect to the central longitudinal axis in the closed position, towards a first side of a first median longitudinal plane passing through the central longitudinal axis and extending in a vertical direction,
   the movable external structure comprises an outlet end defining an oblique transverse plane with respect to the first median longitudinal plane so as to direct the flow of fluid generating the thrust in said oblique direction opposite the actuator so as to generate a force on the movable external structure for tilting the movable external structure around the vertical direction,
   the movable external structure is a one-piece annular structure,
   the first and second primary latches are both located in a latching plane on said first side of said first median longitudinal plane, the latching plane being parallel to the first median longitudinal plane, and
   the actuator is located on a second side of the first median longitudinal plane, the first primary latch being located on one side of a second median longitudinal plane perpendicular to the first median longitudinal plane and extending laterally, the second primary latch being located on a second side of said second median longitudinal plane.

2. The thrust reverser according to claim 1, wherein each of the first and second primary latches is positioned at an angular distance from the actuator comprised between 100° and 120°.

3. The thrust reverser according to claim 1, wherein said actuator is configured to perform a movement without assistance from another actuator.

4. The thrust reverser according to claim 1, wherein the actuator is traversed by the second median longitudinal plane.

5. The aircraft propulsion unit, said propulsion unit comprising the thrust reverser according to claim 1.

6. The propulsion unit according to claim 5, said propulsion unit comprising a pylon for attaching said propulsion unit to a fuselage of an aircraft, the pylon comprising a fairing sheltering said actuator.

7. An aircraft comprising at least one propulsion unit according to claim 5.

8. The thrust reverser according to claim 1, wherein
   the first median longitudinal plane is parallel to a plane passing through a roll axis and a yaw axis of the thrust reverser, and
   the central longitudinal axis is the roll axis of the thrust reverser.

9. The thrust reverser according to claim 1, wherein the actuator includes a cylinder.

\* \* \* \* \*